United States Patent
Ikeda et al.

(10) Patent No.: US 10,518,362 B2
(45) Date of Patent: Dec. 31, 2019

(54) SOLDER ALLOY, SOLDER PASTE, AND ELECTRONIC CIRCUIT BOARD

(71) Applicant: HARIMA CHEMICALS, INCORPORATED, Kakogawa-shi, Hyogo (JP)

(72) Inventors: Kazuki Ikeda, Hyogo (JP); Kosuke Inoue, Hyogo (JP); Kazuya Ichikawa, Hyogo (JP); Tadashi Takemoto, Ibaraki (JP)

(73) Assignee: HARIMA CHEMICALS, INCORPORATED, Kakogawa-shi, Hyogo (JP)

( * ) Notice: Subject to any disclaimer, the term of this patent is extended or adjusted under 35 U.S.C. 154(b) by 45 days.

(21) Appl. No.: 15/747,228

(22) PCT Filed: Jul. 8, 2016

(86) PCT No.: PCT/JP2016/070270
§ 371 (c)(1),
(2) Date: Jan. 24, 2018

(87) PCT Pub. No.: WO2017/018167
PCT Pub. Date: Feb. 2, 2017

(65) Prior Publication Data
US 2018/0214989 A1 Aug. 2, 2018

(30) Foreign Application Priority Data
Jul. 24, 2015 (JP) .................. 2015-146520

(51) Int. Cl.
*B23K 35/26* (2006.01)
*B23K 35/02* (2006.01)
*C22C 13/02* (2006.01)
*B23K 35/22* (2006.01)

(52) U.S. Cl.
CPC .......... *B23K 35/262* (2013.01); *B23K 35/025* (2013.01); *B23K 35/22* (2013.01); *B23K 35/26* (2013.01); *C22C 13/02* (2013.01)

(58) Field of Classification Search
CPC ...... B23K 35/025; B23K 35/22; B23K 35/26; B23K 35/262; B23K 35/3006; C22C 13/00; C22C 13/02; C22C 1/06
See application file for complete search history.

(56) References Cited

U.S. PATENT DOCUMENTS

| 9,445,508 B2 | 9/2016 | Nakanishi et al. |
| 2007/0036671 A1* | 2/2007 | Albrecht .............. B23K 35/262 420/561 |
| 2016/0056570 A1 | 2/2016 | Yoshikawa et al. |

FOREIGN PATENT DOCUMENTS

| CA | 2 969 633 A1 | 6/2016 |
| EP | 2868424 A1 | 5/2015 |
| EP | 2875898 A1 | 5/2015 |
| JP | 5349703 B1 | 11/2013 |
| JP | 5723056 B1 | 5/2015 |
| WO | WO-2014013847 A1 * | 1/2014 ............. C22C 13/00 |
| WO | WO 2014/163167 A1 | 10/2014 |

OTHER PUBLICATIONS

PCT International Preliminary Report on Patentability (IPRP) and Written Opinion dated Feb. 8, 2018, in corresponding International Application No. PCT/JP2016/070270 (13 pages).
International Search Report (PCT/ISA/210) dated Oct. 4, 2016, by the Japanese Patent Office as the International Searching Authority for International Application No. PCT/JP2016/070270.
Written Opinion (PCT/ISA/237) dated Oct. 4, 2016, by the Japanese Patent Office as the International Searching Authority for International Application No. PCT/JP2016/070270.

* cited by examiner

*Primary Examiner* — Jenny R Wu
(74) *Attorney, Agent, or Firm* — Buchanan, Ingersoll & Rooney PC

(57) ABSTRACT

A solder alloy essentially consists of tin, silver, copper, bismuth, antimony, and cobalt; relative to a total amount of the solder alloy, the silver content is 3 mass % or more and 3.5 mass % or less, the copper content is 0.4 mass % or more and 1.0 mass % or less, the bismuth content is 3.5 mass % or more and 4.8 mass % or less, the antimony content is 3 mass % or more and 5.5 mass % or less, the cobalt content is 0.001 mass % or more and 0.1 mass % or less, the tin content is the balance; and a total of the bismuth content and the antimony content is 7.3 mass % or more and 10.3 mass % or less.

7 Claims, No Drawings

SOLDER ALLOY, SOLDER PASTE, AND ELECTRONIC CIRCUIT BOARD

TECHNICAL FIELD

The present invention relates to a solder alloy, a solder paste, and an electronic circuit board, to be specific, to a solder alloy, a solder paste containing the solder alloy, and furthermore, an electronic circuit board in which the solder paste is used.

BACKGROUND ART

In metal connection in electrical and electronic devices, solder connection using a solder paste has been generally used, and in such a solder paste, a solder alloy containing lead has been conventionally used.

However, in view of environmental load, recently, use of lead has been required to be suppressed and thus, the development of a solder alloy containing no lead (lead-free solder alloy) has been promoted.

As such a lead-free solder alloy, for example, a tin-copper alloy, a tin-silver-copper alloy, a tin-silver-indium-bismuth alloy, a tin-bismuth alloy, and a tin-zinc alloy have been well known and among all, a tin-silver-copper alloy, a tin-silver-indium-bismuth alloy, and the like have been widely used.

To be specific, for example, for such a lead-free solder alloy, Patent Document 1 (Examples 45 to 46) below has proposed a lead-free solder alloy containing 1 to 4 mass % of Ag, 0.6 to 0.8 mass % of Cu, 1 to 5 mass % of Sb, 0.01 to 0.2 mass % of Ni, and the balance of Sn, and to be more specific, a lead-free solder alloy containing, for example, 3.4 mass % of Ag, 0.7 mass % of Cu, 3.2 mass % of Bi, 3.0 mass % of Sb, 0.01 mass % or 0.05 mass % of Co, 0.04 mass % of Ni, and the balance of Sn.

CITATION LIST

Patent Document

Patent Document 1: WO2014/163167

SUMMARY OF THE INVENTION

Problem to be Solved by the Invention

A component soldered with such a lead-free solder alloy may be used under relatively severe temperature cycle conditions (e.g., temperature cycle between −40 to 125° C.) such as an engine room of automobiles.

Particularly in recent years, the component soldered with such a lead-free solder alloy may be used under particularly severe temperature cycle conditions (e.g., temperature cycle between −40 to 150° C.), for example, extremely close proximity of engines in automobiles.

In such a case, the lead-free solder alloy has been required to keep thermal fatigue resistance even if it is exposed under severe temperature cycle conditions.

However, the lead-free solder alloy described in Patent Document 1 may not be able to keep fatigue resistance under particularly severe temperature cycle conditions (e.g., temperature cycle between −40 to 150° C.).

An object of the present invention is to provide a solder alloy which can keep excellent thermal fatigue resistance even under exposure to particularly severe temperature cycle conditions (e.g., temperature cycle between −40 to 150° C.), a solder paste containing the solder alloy, and an electronic circuit board produced by using the solder paste.

Means for Solving the Problem

The present invention includes,

[1] a solder alloy essentially consisting of tin, silver, copper, bismuth, antimony, and cobalt, wherein relative to a total amount of the solder alloy, the silver content is 3 mass % or more and 3.5 mass % or less, the copper content is 0.4 mass % or more and 1.0 mass % or less, the bismuth content is 3.5 mass % or more and 4.8 mass % or less, the antimony content is 3 mass % or more and 5.5 mass % or less, the cobalt content is 0.001 mass % or more and 0.1 mass % or less, and the balance is the tin content, and a total of the bismuth content and the antimony content is 7.3 mass % or more and 10.3 mass % or less;

[2] the solder alloy of [1] above, wherein a total of the bismuth content and the antimony content is 8.0 mass % or more and 10.3 mass % or less;

[3] the solder alloy of [1] or [2] above, wherein at least one element selected from the group consisting of nickel and indium is further contained, and relative to a total amount of the solder alloy, more than 0 mass % and 0.2 mass % or less of the element is contained;

[4] the solder alloy of any one of the [1] to [3] above, wherein the copper content is 0.5 mass % or more and less than 0.6 mass %;

[5] the solder alloy of any one of the [1] to [4] above, wherein the cobalt content is more than 0.008 mass % and 0.03 mass % or less;

[6] a solder paste containing a solder powder of the solder alloy of any one of [1] to [5] above, and a flux;

[7] an electronic circuit board including a solder portion soldered with the solder paste of [6] above.

Effect of the Invention

The solder alloy according to one aspect of the present invention is a solder alloy essentially consisting of tin, silver, copper, bismuth, antimony, and cobalt; is designed so that the components are contained in the predetermined amounts described above; and a total of the bismuth content and the antimony content is the predetermined amount as described above.

Therefore, with the solder alloy according to one aspect of the present invention, excellent thermal fatigue resistance can be kept even under particularly severe temperature cycle conditions (e.g., temperature cycle between −40 to 150° C.).

The solder paste of one aspect of the present invention contains the solder alloy of the present invention, and therefore excellent thermal fatigue resistance can be kept even under particularly severe temperature cycle conditions (e.g., temperature cycle between −40 to 150° C.).

In the electronic circuit board of the present invention, the solder paste of the present invention is used in soldering, and therefore excellent thermal fatigue resistance can be kept even under particularly severe temperature cycle conditions (e.g., temperature cycle between −40 to 150° C.).

DESCRIPTION OF EMBODIMENTS

The solder alloy according to one aspect of the present invention contains tin (Sn), silver (Ag), copper (Cu), bismuth (Bi), antimony (Sb), and cobalt (Co) as essential components. In other words, the solder alloy essentially consists of tin, silver, copper, bismuth, antimony, and cobalt.

In this specification, "essentially consists" means that the elements described above are essential components and that optional components described later are allowed to be contained at the proportion described in the following.

In such a solder alloy, the tin content is the balance deducting the components to be described later, and is suitably set in accordance with the blending amounts of the components.

The silver content relative to a total amount of the solder alloy is 3 mass % or more and 3.5 mass % or less, preferably 3.4 mass % or less, more preferably 3.2 mass % or less, even more preferably 3.1 mass % or less.

When the silver content is within the above-described range, excellent thermal fatigue resistance can be achieved, and bonding strength can be kept even under particularly severe temperature cycle conditions.

Meanwhile, there are disadvantages in that when the silver content is below the above-described lower limit, thermal fatigue resistance is poor, and when the silver content is more than the above-described upper limit as well, thermal fatigue resistance is poor.

The copper content relative to a total amount of the solder alloy is 0.4 mass % or more, preferably 0.5 mass % or more, and 1.0 mass % or less, preferably 0.7 mass % or less, more preferably less than 0.6 mass %.

When the copper content is within the above-described range, excellent thermal fatigue resistance can be achieved, and bonding strength can be kept even under particularly severe temperature cycle conditions.

Meanwhile, there are disadvantages in that when the copper content is below the above-described lower limit, thermal fatigue resistance is poor, and when the copper content is more than the above-described upper limit as well, thermal fatigue resistance is poor.

The copper content is, in view of achieving excellent thermal fatigue resistance, particularly preferably, relative to a total amount of the solder alloy, 0.5 mass % or more and less than 0.6 mass %.

That is, when the copper content is within the above-described range, particularly excellent thermal fatigue resistance can be achieved.

The copper content is, in view of achieving excellent impact resistance (to be specific, impact resistance when exposed under temperature cycle conditions), particularly preferably, relative to a total amount of the solder alloy, 0.6 mass % or more and 0.7 mass % or less.

That is, when the copper content is within the above-described range, particularly excellent impact resistance can be achieved.

The bismuth content relative to a total amount of the solder alloy is 3.5 mass % or more, preferably 3.8 mass % or more, more preferably 4.0 mass % or more and 4.8 mass % or less, preferably 4.5 mass % or less, more preferably 4.2 mass % or less.

When the bismuth content is within the above-described range and a total of the bismuth content and the antimony content is within the range described later, excellent thermal fatigue resistance can be achieved, and bonding strength can be kept even under particularly severe temperature cycle conditions.

Meanwhile, there are disadvantages in that when the bismuth content is below the above-described lower limit, thermal fatigue resistance is poor, and when the bismuth content is more than the above-described upper limit as well, thermal fatigue resistance is poor.

The antimony content relative to a total amount of the solder alloy is 3 mass % or more, preferably 3.5 mass % or more, and 5.5 mass % or less, preferably 5 mass % or less, more preferably 4 mass % or less.

When the antimony content is within the above-described range, and a total of the bismuth content and the antimony content is within the range described later, excellent thermal fatigue resistance can be achieved, and bonding strength can be kept even under particularly severe temperature cycle conditions.

Meanwhile, there are disadvantages in that when the antimony content is below the above-described lower limit, thermal fatigue resistance is poor, and when the antimony content is more than the above-described upper limit as well, thermal fatigue resistance is poor.

In the solder alloy of the present invention, a total of the bismuth content and the antimony content is 7.3 mass % or more, preferably 8.0 mass % or more, more preferably 9.0 mass % or more and 10.3 mass % or less, preferably 9.8 mass % or less.

When the total of the bismuth content and the antimony content is within the above-described range, excellent thermal fatigue resistance can be achieved, and bonding strength can be kept even under particularly severe temperature cycle conditions.

Meanwhile, when the total of the bismuth content and the antimony content is below the above-described lower limit, thermal fatigue resistance is poor. When the total of the bismuth content and the antimony content is more than the upper limit as well, thermal fatigue resistance may be poor.

For example, even if the bismuth content and/or the antimony content is within the above-described range, when the total of the bismuth content and the antimony content is not 7.3 mass % or more, thermal fatigue resistance is poor.

The cobalt content relative to a total amount of the solder alloy is 0.001 mass % or more, preferably 0.005 mass % or more, more preferably more than 0.008 mass %, and 0.1 mass % or less, preferably 0.05 mass % or less, more preferably 0.03 mass % or less.

When the cobalt content is within the above-described range, excellent thermal fatigue resistance can be achieved, and bonding strength can be kept even under particularly severe temperature cycle conditions.

Meanwhile, there are disadvantages in that when the cobalt content is below the above-described lower limit, thermal fatigue resistance is poor, and when the cobalt content is more than the above-described upper limit as well, thermal fatigue resistance is poor.

The above-described solder alloy may further contain, as optional components, at least one element selected from the group consisting of nickel (Ni) and indium (In).

When nickel is contained as an optional component, the nickel content relative to a total amount of the solder alloy is, for example, more than 0 mass %, and for example, 0.2 mass % or less.

When the nickel content is within the above-described range, excellent effects of the present invention can be kept.

When the indium is contained as an optional component, the indium content relative to a total amount of the solder alloy is, for example, more than 0 mass %, and for example, 0.2 mass % or less.

When the indium content is within the above-described range, excellent effects of the present invention can be kept.

These optional components can be used singly or can be used in combination of two or more.

When the above-described elements are contained as optional components, the content thereof (when two or more are used in combination, their total) relative to a total amount of the solder alloy is adjusted to be, for example, more than 0 mass %, and for example, 0.2 mass % or less.

When the optional component content in total is within the above-described range, excellent effects of the present invention can be kept.

Such a solder alloy can be obtained by alloying the above-described metal components by a known method such as melting the metal components in a melting furnace to be unified.

The above-described metal components used in the production of the solder alloy can contain a small amount of impurities (inevitable impurities) as long as the excellent effects of the present invention are not inhibited.

Examples of the impurities include aluminum (Al), iron (Fe), zinc (Zn), and gold (Au).

The melting point of the solder alloy obtained in this manner measured by a DSC method (measurement conditions: temperature rising rate of 0.5° C./min) is, for example, 200° C. or more, preferably 210° C. or more, and for example, less than 240° C., preferably 230° C. or less, more preferably 225° C. or less.

When the solder alloy has a melting point within the above-described range, in a case where the solder alloy is used in the solder paste, metal connection can be easily performed with excellent workability, and furthermore, damages to the components to be soldered can be suppressed.

The above-described solder alloy is a solder alloy essentially consisting of tin, silver, copper, bismuth, antimony, and cobalt, and the component contents are designed to be the above-described predetermined amounts, and also designed so that a total of the bismuth content and the antimony content is the above-described predetermined amount.

Therefore, with the above-described solder alloy, excellent thermal fatigue resistance can be kept even under particularly severe temperature cycle conditions (e.g., temperature cycle between −40 to 150° C.).

Thus, the solder alloy is preferably contained in the solder paste (solder paste connecting material).

To be specific, the solder paste according to another aspect of the present invention contains the above-described solder alloy and flux.

The solder alloy in a powdered state is preferably contained in the solder paste.

The shape of the powder is not particularly limited, and for example, the powder shape can be substantially complete spherical, a flat block shape, a needle shape, or can be amorphous. The shape of the powder is suitably set in accordance with the properties (e.g., thixotropy, viscosity) required for the solder paste.

The average particle size (in the case of spherical powder) or the average longitudinal length (in the case of non-spherical powder) of the powder of the solder alloy is, for example, 5 μm or more, preferably 15 μm or more, and for example, 100 μm or less, preferably 50 μm or less in measurement by using a particle diameter and particle size distribution analyzer by a laser diffraction method.

The flux is not particularly limited and a known solder flux can be used.

To be specific, the flux is mainly composed of, for example, a base resin (rosin, acrylic resin, or the like), an activator (e.g., hydrohalogenic acid salt of amine such as ethylamine and propylamine, and organic carboxylic acids such as lactic acid, citric acid, and benzoic acid), and a thixotropic agent (hardened castor oil, bees wax, carnauba wax, or the like) and can further contain an organic solvent when a liquid flux is used.

The solder paste can be obtained by mixing the powder made from the above-described solder alloy with the above-described flux by a known method.

The blending ratio of the solder alloy to the flux (solder alloy:flux (mass ratio)) is, for example, 70:30 to 95:5.

The above-described solder paste contains the above-described solder alloy, and therefore excellent thermal fatigue resistance can be kept even under particularly severe temperature cycle conditions (e.g., temperature cycle between −40 to 150° C.).

The present invention includes an electronic circuit board including a solder portion soldered with the above-described solder paste.

That is, the above-described solder paste is suitably used for, for example, soldering (metal connection) an electronic component to a terminal of a printed circuit board of, for example, electrical and electronic devices.

In other words, the electronic circuit board includes a printed circuit board having a terminal, an electronic component, and a solder portion at which metal connection between the terminal and the electronic component is achieved, wherein the solder portion is formed by reflowing the solder paste.

The electronic component is not particularly limited, and examples thereof include a known electronic component such as chip components (e.g., IC chip), resistors, diodes, condensers, and transistors.

In the electronic circuit board, the above-described solder paste is used in soldering, and therefore excellent thermal fatigue resistance can be kept even under particularly severe temperature cycle conditions (e.g., temperature cycle between −40 to 150° C.).

The method for using the above-described solder alloy is not limited, and other than the above-described solder paste, for example, the above-described solder alloy can be also used in, for example, the production of a resin flux cored solder connecting material. To be specific, for example, the above-described solder alloy is formed into a linear shape with the above-described flux as a core by a known method (e.g., extrusion molding or the like), so that the resin flux cored solder connecting material can be also obtained.

Such a resin flux cored solder connecting material is also preferably used for, similarly with the case of the solder paste, for example, soldering (metal connection) of an electronic circuit board of, for example, electrical and electronic devices.

EXAMPLES

The present invention will hereinafter be described based on Examples and Comparative Examples. The present invention is however not limited by the following Examples. The "parts" and "%" are based on mass unless otherwise specified. The specific numerical values in blending ratio (content), physical property value, and parameter used in the following description can be replaced with upper limits (numerical values defined with "or less" or "below") or lower limits (numerical values defined with "or more" or "more than") of corresponding numerical values in blending ratio (content), physical property value, and parameter described in the above-described "DESCRIPTION OF EMBODIMENTS".

Examples 1 to 31 and Comparative Examples 1 to 18

Preparation of solder alloy

A solder alloy was prepared by blending the powder of the metals shown in Table 1 with the blending formulation shown in Table 1 to produce a metal mixture, and melting and unifying the mixture in a melting furnace.

The blending ratio of the tin (Sn) in the blending formulation of Examples and Comparative Example is the balance subtracting the metals shown in Table 1 (silver (Ag), copper (Cu), bismuth (Bi), antimony (Sb), cobalt (Co), nickel (Ni), and indium (In)) (mass %) from the total amount of the solder alloy. In Table, the balance is shown as "Bal."

In Example 1, a solder alloy was produced using Ag, Cu, Bi, Sb, and Co with the ratio shown in Table 1, and the balance of Sn.

In formulation of Examples 2 to 4, and 16 to 18, Co was increased or decreased relative to the formulation in Example 1.

In formulation of Example 5, Ag and Cu were increased relative to the formulation in Example 1.

In formulation of Example 6, Ag was increased relative to the formulation in Example 1.

In formulation of Examples 7 to 8 and 27 to 28, Cu was increased or decreased relative to the formulation in Example 1.

In formulation of Examples 9 to 13 and 19 to 20, Bi and/or Sb was increased or decreased relative to the formulation in Example 1, and their total amount was adjusted.

In formulation of Example 14, Bi and Sb were increased relative to the formulation of Example 3, and Ni was further blended.

In formulation of Example 15, Ag and Cu were increased relative to the formulation of Example 14.

In formulation of Examples 21 and 24, Ni was further blended to the formulation in Example 1, and Ni content was increased or decreased.

In formulation of Example 22, Co was decreased and Ni was further blended relative to the formulation in Example 1.

In formulation of Example 23, Ag and Cu were increased relative to the formulation of Example 22.

In Example 25, In was further blended to the formulation in Example 1.

In Example 26, Ni and In were further blended to the formulation in Example 1.

In formulation of Examples 29 and 30, Sb was increased, and Ni was further blended relative to the formulation of Example 3.

In formulation of Example 31, Bi and Sb were increased, and Ni was further blended relative to the formulation of Example 3.

In Comparative Examples 1 to 2, Ag was increased or decreased to make Ag excessive or deficient relative to the formulation in Example 1.

In Comparative Examples 3 to 4, Cu was increased or decreased to make Cu excessive or deficient relative to the formulation in Example 1.

In Comparative Examples 5 to 6, Bi was increased or decreased to make Bi excessive or deficient, with the predetermined blending amount of Sb, and the predetermined total amount of Bi and Sb relative to the formulation in Example 1.

In Comparative Examples 7 to 8, Co was increased or decreased to make Co excessive or deficient relative to the formulation in Example 1.

In Comparative Examples 9 to 10, Bi or Sb was increased or decreased to make the blending amount of Bi and the blending amount of Sb within the predetermined amount but their total was deficient relative to the formulation in Example 1.

In Comparative Example 11, Ag, Cu, and Sb were increased, Ni was blended, and Co was not blended relative to the formulation in Example 1.

In Comparative Examples 12 to 13, Co was blended, Bi and Sb were decreased to make Bi deficient and a total of Bi and Sb deficient but the blending amount of Sb appropriate relative to the formulation of Comparative Example 11.

In Comparative Examples 14 to 15, Sb was decreased to make the blending amount of Bi within the predetermined amount, the total amount of Bi and Sb within the predetermined amount, but Sb excessive or deficient relative to the formulation in Example 1.

In Comparative Example 16, Bi and Sb were increased to make the blending amount of Bi within the predetermined amount, but Sb excessive, and the total amount of Bi and Sb excessive relative to the formulation in Example 1.

In Comparative Example 17, Bi and Sb were increased to make the blending amount of Sb within the predetermined amount, Bi excessive, and the total amount of Bi and Sb excessive relative to the formulation in Example 1.

In Comparative Example 18, Bi and Sb were increased to make Bi and Sb excessive, and a total amount of Bi and Sb excessive relative to the formulation in Example 1.

Preparation of solder paste

The produced solder alloy was powdered so that its particle size was 25 to 38 μm, and the obtained solder alloy powder and a known flux were blended, thereby producing a solder paste.

Evaluation of solder paste

The produced solder paste was printed on a printed circuit board for mounting chip components, and the chip components were mounted by reflowing. The printing conditions of the solder paste at the time of mounting, and the size of the chip components were suitably set in accordance with the evaluations described later. The results are shown in Table 1.

TABLE 1

| No. | Blending Formulation (mass %) | | | | | | | | | Thermal fatigue resistance |
|---|---|---|---|---|---|---|---|---|---|---|
| | Sn | Ag | Cu | Bi | Sb | Co | Ni | In | Bi + Sb | |
| Example 1 | Bal. | 3.0 | 0.5 | 4.0 | 3.5 | 0.01 | — | — | 7.5 | B |
| Example 2 | Bal. | 3.0 | 0.5 | 4.0 | 3.5 | 0.001 | — | — | 7.5 | C− |
| Example 3 | Bal. | 3.0 | 0.5 | 4.0 | 3.5 | 0.005 | — | — | 7.5 | C |
| Example 4 | Bal. | 3.0 | 0.5 | 4.0 | 3.5 | 0.007 | — | — | 7.5 | B− |
| Example 5 | Bal. | 3.5 | 0.7 | 4.0 | 3.5 | 0.01 | — | — | 7.5 | C |
| Example 6 | Bal. | 3.5 | 0.5 | 4.0 | 3.5 | 0.01 | — | — | 7.5 | B |
| Example 7 | Bal. | 3.0 | 0.55 | 4.0 | 3.5 | 0.01 | — | — | 7.5 | B |
| Example 8 | Bal. | 3.0 | 0.7 | 4.0 | 3.5 | 0.01 | — | — | 7.5 | C |

TABLE 1-continued

| | Blending Formulation (mass %) | | | | | | | | | |
|---|---|---|---|---|---|---|---|---|---|---|
| No. | Sn | Ag | Cu | Bi | Sb | Co | Ni | In | Bi + Sb | Thermal fatigue resistance |
| Example 9 | Bal. | 3.0 | 0.5 | 3.5 | 4.0 | 0.01 | — | — | 7.5 | B |
| Example 10 | Bal. | 3.0 | 0.5 | 4.8 | 3.5 | 0.01 | — | — | 8.3 | A |
| Example 11 | Bal. | 3.0 | 0.5 | 4.5 | 3.0 | 0.01 | — | — | 7.5 | B |
| Example 12 | Bal. | 3.0 | 0.5 | 4.0 | 5.5 | 0.01 | — | — | 9.5 | A |
| Example 13 | Bal. | 3.0 | 0.5 | 4.8 | 5.0 | 0.01 | — | — | 9.8 | A |
| Example 14 | Bal. | 3.0 | 0.5 | 4.8 | 5.0 | 0.005 | 0.05 | — | 9.8 | A |
| Example 15 | Bal. | 3.5 | 0.7 | 4.8 | 5.0 | 0.005 | 0.05 | — | 9.8 | B |
| Example 16 | Bal. | 3.0 | 0.5 | 4.0 | 3.5 | 0.009 | — | — | 7.5 | B |
| Example 17 | Bal. | 3.0 | 0.5 | 4.0 | 3.5 | 0.10 | — | — | 7.5 | C |
| Example 18 | Bal. | 3.0 | 0.5 | 4.0 | 3.5 | 0.03 | — | — | 7.5 | B |
| Example 19 | Bal. | 3.0 | 0.5 | 3.5 | 3.8 | 0.01 | — | — | 7.3 | B |
| Example 20 | Bal. | 3.0 | 0.5 | 4.3 | 3.0 | 0.01 | — | — | 7.3 | B |
| Example 21 | Bal. | 3.0 | 0.5 | 4.0 | 3.5 | 0.01 | 0.05 | — | 7.5 | A |
| Example 22 | Bal. | 3.0 | 0.5 | 4.0 | 3.5 | 0.005 | 0.05 | — | 7.5 | B |
| Example 23 | Bal. | 3.5 | 0.7 | 4.0 | 3.5 | 0.005 | 0.05 | — | 7.5 | B− |
| Example 24 | Bal. | 3.0 | 0.5 | 4.0 | 3.5 | 0.01 | 0.20 | — | 7.5 | A |
| Example 25 | Bal. | 3.0 | 0.5 | 4.0 | 3.5 | 0.01 | — | 0.20 | 7.5 | A |
| Example 26 | Bal. | 3.0 | 0.5 | 4.0 | 3.5 | 0.01 | 0.10 | 0.10 | 7.5 | A |
| Example 27 | Bal. | 3.0 | 1.0 | 4.0 | 3.5 | 0.01 | — | — | 7.5 | C |
| Example 28 | Bal. | 3.0 | 0.4 | 4.0 | 3.5 | 0.01 | — | — | 7.5 | C |
| Example 29 | Bal. | 3.0 | 0.5 | 4.0 | 4.0 | 0.005 | 0.05 | — | 8.0 | A |
| Example 30 | Bal. | 3.0 | 0.5 | 4.0 | 5.0 | 0.005 | 0.05 | — | 9.0 | A |
| Example 31 | Bal. | 3.0 | 0.5 | 4.5 | 4.5 | 0.005 | 0.05 | — | 9.0 | A |
| Comparative Example 1 | Bal. | 2.9 | 0.5 | 4.0 | 3.5 | 0.01 | — | — | 7.5 | D |
| Comparative Example 2 | Bal. | 3.6 | 0.5 | 4.0 | 3.5 | 0.01 | — | — | 7.5 | D |
| Comparative Example 3 | Bal. | 3.0 | 0.3 | 4.0 | 3.5 | 0.01 | — | — | 7.5 | D |
| Comparative Example 4 | Bal. | 3.0 | 1.1 | 4.0 | 3.5 | 0.01 | — | — | 7.5 | E |
| Comparative Example 5 | Bal. | 3.0 | 0.5 | 3.0 | 4.5 | 0.01 | — | — | 7.5 | D |
| Comparative Example 6 | Bal. | 3.0 | 0.5 | 5.0 | 3.5 | 0.01 | — | — | 8.5 | D |
| Comparative Example 7 | Bal. | 3.0 | 0.5 | 4.0 | 3.5 | 0.0005 | — | — | 7.5 | D |
| Comparative Example 8 | Bal. | 3.0 | 0.5 | 4.0 | 3.5 | 0.12 | — | — | 7.5 | E |
| Comparative Example 9 | Bal. | 3.0 | 0.5 | 3.5 | 3.5 | 0.01 | — | — | 7.0 | D |
| Comparative Example 10 | Bal. | 3.0 | 0.5 | 4.0 | 3.0 | 0.01 | — | — | 7.0 | D |
| Comparative Example 11 | Bal. | 3.4 | 0.7 | 4.0 | 5.0 | 0 | 0.04 | — | 9.0 | D |
| Comparative Example 12 | Bal. | 3.4 | 0.7 | 3.2 | 3.0 | 0.01 | 0.04 | — | 6.2 | E |
| Comparative Example 13 | Bal. | 3.4 | 0.7 | 3.2 | 3.0 | 0.05 | 0.04 | — | 6.2 | E |
| Comparative Example 14 | Bal. | 3.0 | 0.5 | 4.5 | 2.8 | 0.01 | — | — | 7.3 | D |
| Comparative Example 15 | Bal. | 3.0 | 0.5 | 4.0 | 5.7 | 0.01 | — | — | 9.7 | D |
| Comparative Example 16 | Bal. | 3.0 | 0.5 | 4.8 | 6.0 | 0.01 | — | — | 10.8 | E |
| Comparative Example 17 | Bal. | 3.0 | 0.5 | 7.0 | 5.0 | 0.01 | — | — | 12.0 | E |
| Comparative Example 18 | Bal. | 3.0 | 0.5 | 5.0 | 5.8 | 0.01 | — | — | 10.8 | E |

<Evaluation>

The solder paste produced in Examples and Comparative Examples was printed on a printed circuit board for mounting chip components, and the chip components were mounted by reflowing. The solder paste was printed using a metal mask with a thickness of 150 μm to adjust its thickness. After printing the solder paste, a chip component with a size 3216 (3.2 mm×1.6 mm) was mounted on a predetermined position on the printed circuit board, and heated in a reflow oven, thereby mounting the chip component. The reflow conditions were set as follows: preheating of 170 to 190° C., peak temperature of 245° C., the time the temperature is 220° C. or more is 45 seconds, cooling speed at the time of decreasing temperature from the peak temperature to 200° C. is 3 to 8° C./sec.

Furthermore, the printed circuit board was subjected to hot and cold cycle test, in which it is kept under environment of −40° C. for 30 minutes, and then kept under environment of 150° C. for 30 minutes.

<Thermal Fatigue Resistance>

The printed circuit board that went through repeated hot and cold cycles of 1500, 2000, 2250, 2500, 2750, or 3000 was cut at the portion where the 3216 chip components were soldered, and the cross section was polished. The cross section after polishing was observed with a microscope, and evaluated as to if the cracks caused at the solder fillet portion cross the entire fillet portion. They were ranked based on the following criteria. For each cycle, 20 chips were evaluated.

A: cracks crossing the entire fillet portion were not caused even after 3000 cycles.

B: cracks crossing the entire fillet were not caused after 2750 cycles, but cracks crossing the entire fillet portion were caused after 3000 cycles.

B−: cracks crossing the entire fillet were not caused after 2500 cycles, but cracks crossing the entire fillet portion were caused after 2750 cycles.

C: cracks crossing the entire fillet were not caused after 2250 cycles, but cracks crossing the entire fillet portion were caused after 2500 cycles.

C−: cracks crossing the entire fillet were not caused after 2000 cycles, but cracks crossing the entire fillet portion were caused after 2250 cycles.

D: cracks crossing the entire fillet were not caused after 1500 cycles, but cracks crossing the entire fillet portion were caused after 2000 cycles.

E: cracks crossing the entire fillet portion were caused after 1500 cycles.

While the illustrative embodiments and examples of the present invention are provided in the above description, such are for illustrative purpose only and it is not to be construed limitatively. Modification and variation of the present invention which will be obvious to those skilled in the art are to be covered in the following claims.

INDUSTRIALLY APPLICABILITY

The solder alloy and the solder paste of the present invention are used for electronic circuit boards used in electrical and electronic devices.

The invention claimed is:

1. A solder alloy consisting of tin, silver, copper, bismuth, antimony, and cobalt, and optionally at least one element selected from the group consisting of nickel and indium, and no or a small amount of inevitable impurities, wherein
relative to a total amount of the solder alloy,
the silver content is 3 mass % or more and 3.5 mass % or less,
the copper content is 0.4 mass % or more and less than 0.6 mass %,
the bismuth content is 3.5 mass % or more and 4.8 mass % or less,
the antimony content is 3 mass % or more and 5.5 mass % or less,
the cobalt content is more than 0.008 mass % and 0.1 mass % or less,
the content of the at least one optional element selected from the group consisting of nickel and indium, if contained, is 0.2 mass % or less, and
the balance is the tin content; and
a total of the bismuth content and the antimony content is 7.3 mass % or more and 10.3 mass % or less.

2. The solder alloy according to claim 1, wherein
a total of the bismuth content and the antimony content is 8.0 mass % or more and 10.3 mass % or less.

3. The solder alloy according to claim 1, wherein
relative to a total amount of the solder alloy, more than 0 mass % and 0.2 mass % or less of the at least one optional element selected from the group consisting of nickel and indium is contained.

4. The solder alloy according to claim 1, wherein the copper content is 0.5 mass % or more and less than 0.6 mass %.

5. The solder alloy according to claim 1, wherein the cobalt content is more than 0.008 mass % and 0.03 mass % or less.

6. A solder paste containing a solder powder of the solder alloy according to claim 1, and
a flux.

7. An electronic circuit board comprising
a portion soldered with the solder paste of claim 6.

* * * * *